United States Patent [19]

Dixon

[11] 4,203,630
[45] May 20, 1980

[54] BRAKE CONTROL UNITS

[75] Inventor: Alan G. Dixon, Solihull, England

[73] Assignee: Girling Limited, Birmingham, England

[21] Appl. No.: 954,282

[22] Filed: Oct. 24, 1978

[30] Foreign Application Priority Data

Oct. 27, 1977 [GB] United Kingdom ............... 44857/77
Mar. 22, 1978 [GB] United Kingdom ............... 11271/78

[51] Int. Cl.² .............................................. B60T 8/14
[52] U.S. Cl. ..................................... 303/24 C; 303/6 C
[58] Field of Search ............... 303/6 C, 9, 22 R, 24 A,
303/24 C, 24 F; 188/349

[56] References Cited

U.S. PATENT DOCUMENTS

| 3,489,465 | 1/1970 | Bueler | 303/24 C |
| 3,771,835 | 11/1973 | Yabuta | 303/24 A X |
| 4,071,281 | 1/1978 | Tomoyuki | 303/24 A |

FOREIGN PATENT DOCUMENTS 1079507 8/1967 United Kingdom ................ 303/24 C Primary Examiner—Duane A. Reger
Attorney, Agent, or Firm—Scrivener, Parker, Scrivener and Clarke

[57] ABSTRACT

A brake control unit for a vehicle hydraulic braking system is adapted for incorporation between the master cylinder and the rear wheel brakes, with the front wheel brakes being applied by pressure from the master cylinder. The control unit incorporates an outlet connected to the rear wheel brakes, and an inertia-controlled valve, which closes when the deceleration of the vehicle is excessive, to ensure by means of a metering valve that any subsequent increase in pressure applied at the outlet occurs at a rate less than the rate at which the master cylinder pressure increases. The unit also incorporates an override responsive to front wheel brake pressure which is operative, following closure of the inertia-controlled valve and reduction in front wheel brake pressure, to override the effect of the inertia-controlled valve.

12 Claims, 5 Drawing Figures

BRAKE CONTROL UNITS

SPECIFIC DESCRIPTION

This invention relates to a new or improved brake control unit for a vehicle hydraulic braking system, the control unit being adapted for incorporation between a master cylinder and at least one hydraulic actuator for rear wheel brakes with the front wheel brakes being applied directly by pressure from the master cylinder, the control unit being of the kind incorporating an inertia-controlled valve which closes when the deceleration of the vehicle in which the unit is incorporated exceeds a predetermined value, and an outlet port for connection to the hydraulic actuator, closure of the valve being operative to ensure that any subsequent increase in pressure applied to the outlet port occurs at a lesser rate than that at which the pressure of the master cylinder itself can increase.

Thus, after the inertia-controlled valve closes, a higher pressure will subsequently be applied to the front wheels than to the rear wheels, and with the aim of preventing the rear wheels from skidding which otherwise would be more likely to occur due to the transfer of weight from the rear wheels to the front wheels as the brakes are applied.

Known brake control units of the kind set forth suffer from the disadvantage that after the inertia-controlled valve has closed, the rate of pressure increase applied to the rear wheels will be insufficient to provide effective vehicle retardation upon failure of the front wheel brakes.

According to our invention a brake control unit of the kind set forth incorporates pressure-responsive override means responsive to the pressure applied to the front wheel brakes, the override means being operative after closure of the inertia-controlled valve and following reduction or failure of the pressure applied to the front wheel brakes to override the effect of the inertia-controlled valve in reducing the rate of pressure increase applied to the rear wheel brakes.

The pressure-responsive override means is constructed and arranged to be operative when the pressure applied to the front wheel brakes drops to a predetermined value so that, thereafter, full master cylinder pressure can be applied to the rear wheel brakes irrespective of the loading on the vehicle. This ensures that a substantial braking force is available for vehicle retardation, even following failure of the front wheel brakes.

Preferably the override means comprises a piston which works in a bore in a housing and which is subjected at opposite ends to the pressure applied to the front wheel brakes and to a control pressure in a control chamber corresponding to that applied to the rear wheel brakes before the inertia-controlled valve closes, and pressure is applied to the rear wheel brakes through a passage which by-passes the inertia-controlled valve and a second metering valve responsive to movement of the piston and which is open when the interia-controlled valve is open, the second valve closing in response to movement of the piston following closure of the inertia-controlled valve and when the pressure applied to the front wheel brakes has attained a predetermined value sufficient to overcome a bias force biassing the metering valve into an open position.

The piston and the bias force are constructed and arranged to provide a delay before the metering valve can close following closure of the inertia-controlled valve and thereby determine a convenient "cut-off" point at which the pressure supplied to the rear brakes is cut-off and thereafter metered to provide a reduced rate of pressure increase. The cut-off point is dependant on the loading of a spring which biasses the metering valve into the open position and also on the magnitude of the control pressure. Preferably, the piston is of differential outline and the relative areas of opposite ends are chosen to assist in determining the cut-off point.

Conveniently the end of smaller area is exposed to the pressure applied to the front wheel brakes and the end of greater area is exposed to the control pressure and acts on the metering valve through a thrust member. This has the effect of delaying closure of the metering valve until force of the pressure acting on the smaller area exceeds the force acting in the opposite direction, namely the force in the spring biassing the metering valve into the open position plus the control pressure acting over an area equal to the difference in areas between the end of greater area and the thrust member. Thereafter initial increase in the pressure applied to the front wheel brakes and to the by-pass passage causes the metering valve to open when a force generated by that increased pressure acting over the area of the metering valve exceeds a force equal to that pressure acting over the end of the piston which is of smaller area. This provides a metered flow of fluid to the rear brakes which is regulated by opening and closing of the metering valve in accordance with the ratio between the areas of the smaller end of the piston and the metering valve.

Thus the control unit is operated by using a control pressure which is equal to the pressure applied to the front and rear wheel brakes when the inertia-controlled valve closes, and is therefore dependent on the loading of the vehicle, brake operating pressures generally being proportional to the loading of the vehicle. The control unit, in addition to incorporating the override means, also has a cut-off or metering point for controlling the pressure applied to the rear wheel brakes, also dependent on the loading of the vehicle, without the provision of any direct communication between the valve and the vehicle. Thus each unit has a fixed ratio of cut-off pressure to control pressure.

This fixed ratio establishes the cut-off pressure for a given control pressure, and may cause difficulty in constructing a unit which is sufficiently sensitive to operate satisfactorily under different conditions of loading.

This means that is a higher ratio is used in order to maintain effective braking when the vehicle is laden, the cut-off pressure may be too high when the vehicle is unladen, and consequently wheel lock and skidding may occur. If the ratio is lowered to account for this then the cut-off pressure may be too low for the laden vehicle.

Preferably, in a modification of the invention, the brake control unit also incorporates a trap line valve in the line between the inertia-controlled valve and the control chamber.

The trap line valve is biassed to closure, and opens only when the inertia-controlled valve is open and the pressure differential across the trap line valve is sufficient to overcome the bias force.

The trap line valve may also incorporate a recuperation valve to allow fluid recuperation from the control chamber after release for the brakes.

The effect of the trap line valve is to prevent pressurisation of the control chamber until a predetermined minimum brake operating pressure is reached.

Thus, if the inertia-controlled valve closes before this minimum pressure is reached, the trap valve will not open, and there will be no effective control pressure. The behaviour of the metering valve will depend only on the characteristics of the pressure-responsive override means and thus the cut-off pressure will be generally constant. This effectively lowers the cut-off pressure: deceleration pressure ratio for braking pressures up to the predetermined level.

Some embodiments of our invention are illustrated in the accompanying drawings, in which.

Figure 1:
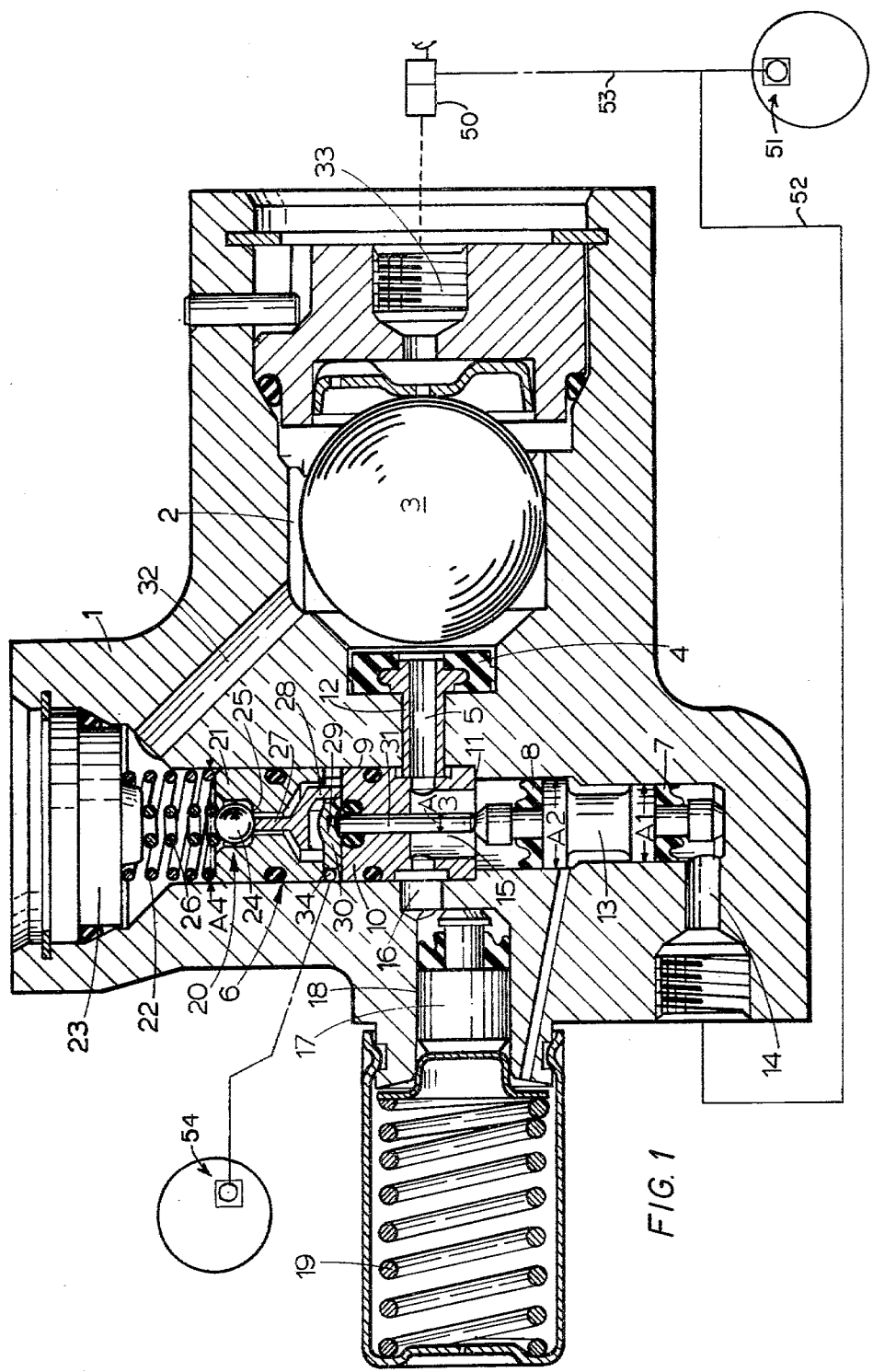
FIG. 1 is a longitudinal section through a brake control valve unit for a vehicle hydraulic braking system.

The brake control unit illustrated in FIG. 1 comprises a housing 1 incorporating a chamber 2 in which is housed an inertia-controlled valve comprising an inertia-responsive member in the form of a ball 3 for engagement with a seating 4 surrounding a passage 5.

A stepped bore 6 is provided in the housing 1 in a position normal to the passage 5 and the bore 6 has three bore portions 7, 8 and 9 of progressively increased diameter. A sleeve 10 of cup-shaped outline and having an internal diameter less than that of the bore portion 7 is housed in the bore portion 9 with the rim at its open end in abutment with a shoulder 11 at a step in the change in diameter between the bore portions 8 and 9. The sleeve 10 is held against movement by a headed tube 12 which defines the passage 5, provides a mounting for the valve seating 4 and communicates with the interior of the sleeve 10 and the bore portion 8.

A differential piston 13 comprising pressure-responsive override means is located in the bore portion 7 and 8. The piston 13 has an outer end of smaller area $A_1$ exposed to pressure at an inlet port 14 and an inner end of greater area $A_2$ exposed to pressure in a control chamber 15 defined between the sleeve 10 and the piston 13. In addition a transverse passage 16 leading from the control chamber 15 communicates with a piston 17 which is normally urged into engagement with the inner end of a transverse bore 18 in which it works by means of a compression spring 19. The spring 19 working through the piston 17 acts to maintain the pressure in control chamber 15.

A metering valve 20 is housed in the bore portion 9. The metering valve 20 comprises a movable seating member 21 in the form of a sleeve of area $A_4$ which is urged towards the closed end of the sleeve 10 by means of a pre-loaded spring 22 in abutment with a closure plug 23 for that end of the bore 6. A valve member 24 in the form of a ball is urged towards a seating 25 in the seating member by means of a second compression spring 26, also in abutment with the plug 23. The ball 24 is normally held away from the seating 25 by means of a member 27 of tripod outline of which the legs 28 abut against the closed end of the sleeve 10.

Operation of the metering valve 20 is controlled by a thrust member 29 which has three angularly spaced fingers 30 projecting radially between adjacent pairs of legs 28 to engage with the end of the movable sleeve 21. The fingers 30 act to move the movable sleeve 21 axially in response to an axial force applied to the centre of the thrust member 29 by means of a strut 31 of relatively smaller area $A_3$ which works through a bore in the closed end of the sleeve 10 and has a point contact with the inner end of the piston 13.

A by-pass passage 32 by-passing the inertia-controlled valve provides communication at all times between the chamber 2 and the bore portion 9 on the upstream side of the metering valve 20.

The unit is installed in a vehicle with the axis of the chamber 2 which contains the axis of the passage 5 being parallel to the main axis of the vehicle. The housing 1 is located at any convenient attitude so that the ball 3 has to run up an incline to engage the seating 4 which is relatively forward of of the ball in the vehicle.

An inlet port 33 leading into the chamber 2 is connected to an hydraulic master cylinder 50 and the master cylinder also supplies fluid from a different pressure space to brakes 51 on the front wheels of the vehicle. A pipe-line 52 provides a connection to the inlet port 14 from pipe-lines 53 leading to the front wheel brakes so that the area $A_1$ is exposed at all times to the pressure applied to the front wheels. Finally, an outlet port 34 communicates with a space within the sleeve 21 and between the adjacent ends of the sleeves 10 and 21 is connected to the brakes 54 on the rear wheels of the vehicle.

When the master cylinder is operated to apply the brakes fluid is supplied directly to the front wheel brakes and from the chamber 2 to the rear brakes through the metering valve 20. Under these conditions the metering valve is held open by the tripod member 27 which holds the ball 24 away from the seating 25 when the movable seating member 21 is biassed into abutment with the sleeve 10 by the spring 22. In addition, fluid from the chamber 2 is supplied to the control chamber 15 through the passage 5 and past the inertia-controlled valve which is open. Thus, the piston 13 is held in a stationary position in engagement with the closed end of the bore since opposite ends of the piston are submitted to equal or substantially equal pressures.

When the deceleration of the vehicle attains a predetermined value the ball 3 engages with the seating 4 to isolate the chamber 2 from the control chamber 15 at the pressure then applied to the rear wheel brakes $P_C$ and which is maintained by the force in the spring 19 acting through the piston 17.

Thereafter the pressure applied to the front and rear wheels can continue to rise with increase in master cylinder pressure until the pressure applied to the front brakes $P_F$, acting over the area $A_1$ is greater than the force acting in the opposite direction namely $P_C (A_2 - A_3)$ plus the force in the spring 22. When this condition is reached, the seating member 21 is advanced in the bore portion 9 to engage with the ball 24 and close the metering valve. This cuts-off the supply of fluid to the rear wheel brakes.

If the master cylinder pressure is increased, that increased pressure acts over the area $A_4$. Since the force due to the increased pressure acting on the area $A_4$ is greater than the force acting in the opposite direction previously to close the metering valve 20, the seating member 21, the thrust members 29 31 and the piston 13 move relatively away from the end closure 23. Since the ball 24 is held by the tripod member 27,28 in a relatively fixed position, the metering valve 20 re-opens to permit that increased master cylinder pressure to pass to the rear wheel brakes.

As soon as the second valve 20 opens the previous condition applies and the force $P_F A_1$ again acts to close the metering valve 20. It follows therefore that after initial closure of the metering valve 20, the rear wheel brakes are supplied with fluid at a rate of pressure increase which is metered by opening and closing of the metering valve 20 in accordance with the ratio of the area $A_1$ of the smaller end of the piston 13 and the area $A_4$ of the movable valve seating member 21.

Since operation of the control unit is dependent upon a control pressure $P_C$ which is equal to a pressure applied to both front and rear wheel brakes when the inertia-controlled valve closes, the operation of the unit is therefore dependent upon the loading of the vehicle, since changes in loading will alter the brake operating pressures and thus the point at which the inertia-controlled valve closes.

Upon failure of the supply of fluid to the front wheel brakes the pressure $P_F$ acting over the area $A_1$ on piston 13 will be reduced or will disappear completely so that there will be no force present which otherwise can cause the metering valve to close. Therefore the rear wheel brakes will be applied continuously at the pressure at that time generated in the master cylinder.

Should failure occur before or during a brake application and in any case before the inertia-controlled valve closes, clearly no force can be produced to close the metering valve 20 after closure of the inertia-controlled valve.

Should failure occur after the inertia-controlled valve has closed, the reduction in the pressure $P_F$ previously acting over the area $A_1$ means that the forces acting on the piston 13 cannot cause the metering valve 20 to close. Thus the piston 13 acts as a pressure-responsive override means to override the effect of the inertia-controlled valve in reducing the rate of pressure increase applied to the rear wheel brakes.

Figure 2:
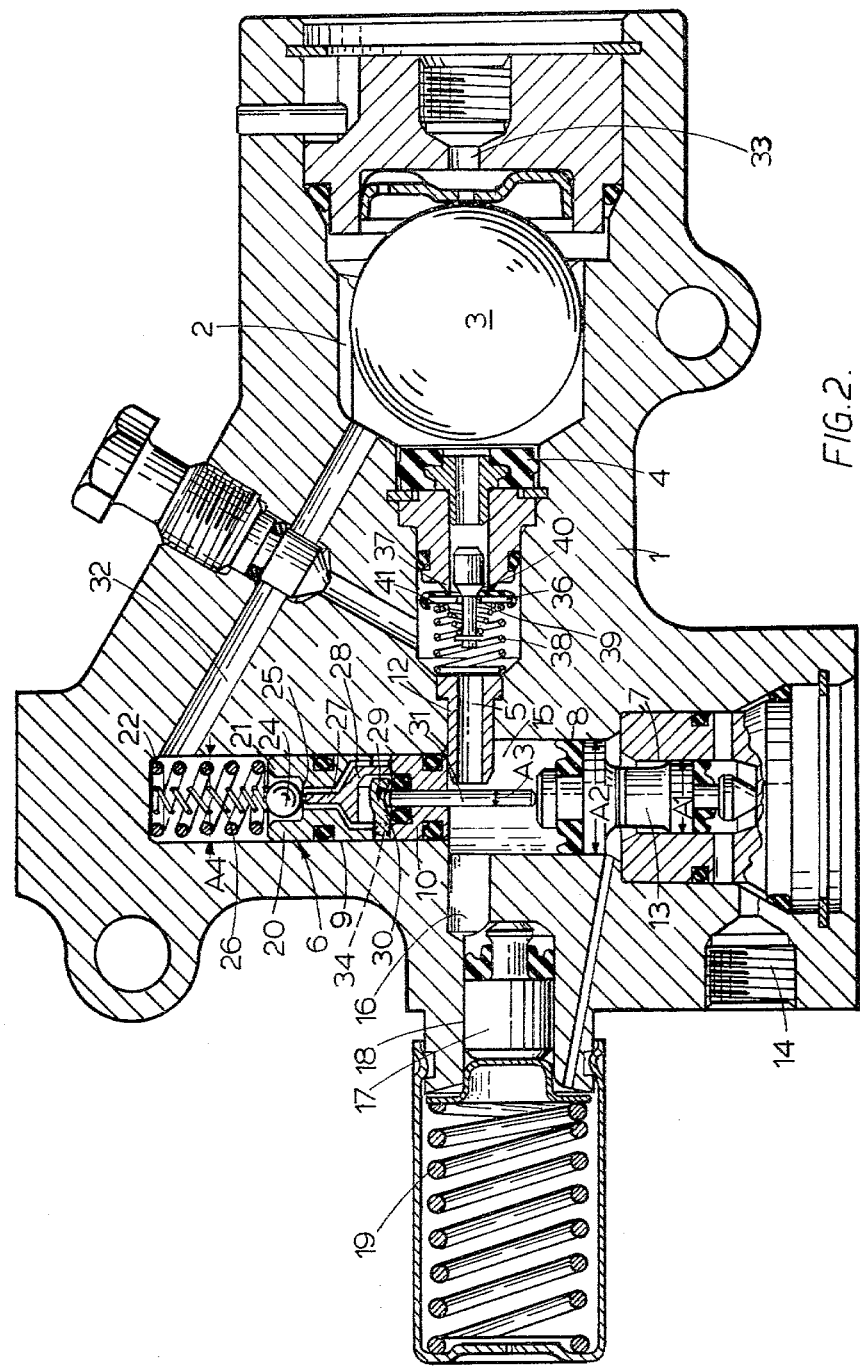
FIG. 2 is a view similar to FIG. 1 showing a further embodiment.

The brake control unit illustrated in FIG. 2 is a modification of that shown in FIG. 1, and corresponding reference numerals have been applied to corresponding parts.

In the brake control unit of FIG. 2 a trap line valve 35 is incorporated in the passage 5, between the chamber 2 and the control chamber 15. The trap line valve comprises a valve member 36 which is biassed to closure against a valve seating 37 between the valve member 36 and the inertia-controlled valve by a compression spring 38. A recuperation valve passes through an opening 39 in the valve member 36. The recuperation valve comprises a frusto-conical poppet 40 which is biassed into engagement with a portion surrounding the opening 39 by a spring 41. The rest of the construction is similar to that described with reference to FIG. 1.

When the master cylinder is operated to apply the brakes fluid is supplied directly to the front wheel brakes and from the chamber 2 to the rear wheel brakes through the metering valve 20. Under these conditions the metering valve is held open by the tripod member 27 which holds the ball 24 away from the seating 25 when the movable seating member 21 is biassed into abutment with the sleeve 10 by the spring 22. However no fluid will be supplied to the control chamber 15 from the chamber 2 until the pressure of the fluid is sufficient to overcome the force in the spring 38, thus opening the trap valve. The force in the spring 22 is chosen so that the piston 13 will remain stationary when the trap valve 35 is closed.

When the deceleration of the vehicle attains a predetermined value the ball 3 engages with the seating 4. There are two cases to consider; firstly when this happens before the trap valve 35 opens, and secondly when it happens after the trap valve 35 has opened.

In the first case the trap valve 35 will stay closed, and there will be effectively no control pressure in the control chamber 15. The behaviour of the metering valve will depend only on the forces in the springs 19 and 22 and on the relative areas of $A_1$ and $A_4$, and $A_3$. The metering valve 20 will close when the force $P_F A_1$ overcomes the force in the spring 22. The force $P_F A_1$ will, however, generate a control pressure $P_c$ in the control chamber which is determined by the force in the spring 19. Thus the condition for the metering valve to close may be expressed as $P_F A_1 > P_c(A_2 - A_3) + P_F A_3 +$ force in spring 22. The valve will open again when the pressure acting over the area $A_4$ and the pressure in the control chamber is greater than the forces tending to close the valve previously.

However, in the second case, where the ball 3 engages with its seating 4 after the trap valve 35 has opened, the unit will operate as described with reference to FIG. 1 although a finite pressure differential will exist between the control chamber 15 and the chamber 2, due to the loading in the spring 38, and the area of the passage 42 between the trap valve and the chamber 2.

In this case, when the braking pressure is released and the inertia-controlled valve opens again, a reverse pressure differential will occur across the trap valve 35. This will close the trap valve, and overcome the force in the spring 41 (which is only lightly loaded) to cause the recuperation valve to open. This permits fluid recuperation from the control chamber 15 and ensures that the chamber does not remain pressurised, as this would affect the operation of the valve 20 in a subsequent brake application.

Figure 3:
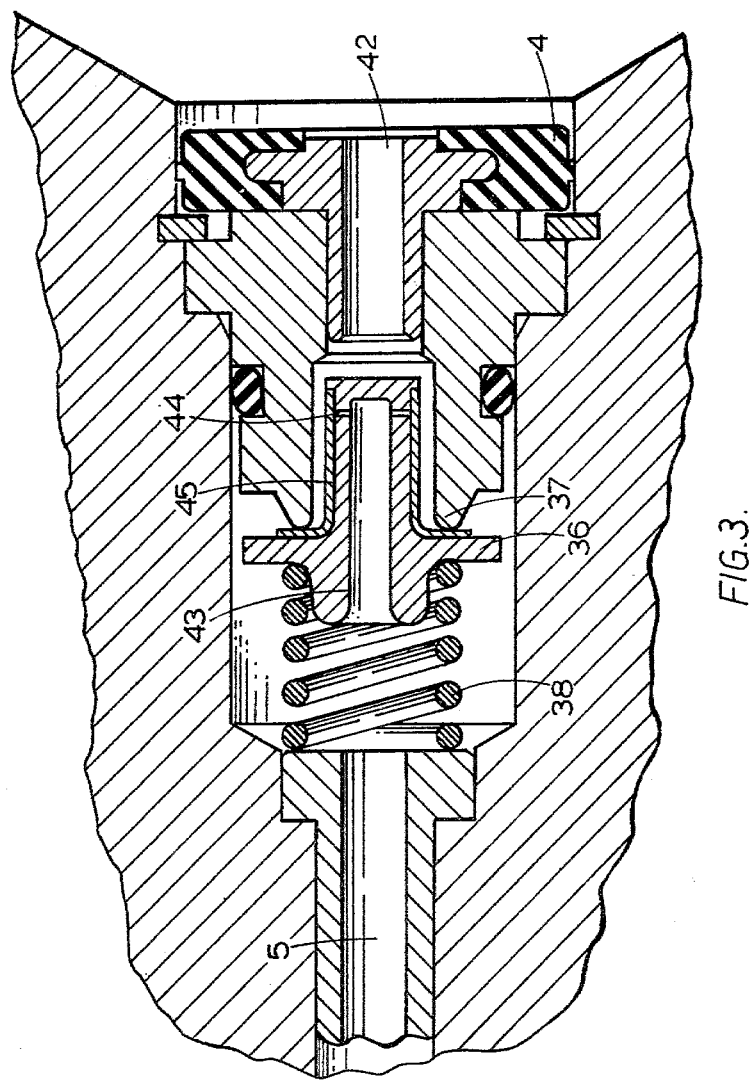
FIG. 3 is a longitudinal section through part of the unit of FIG. 2 showing a modification.

A preferred construction of the recuperation valve is shown in FIG. 3. In this construction the valve member 36 is provided in its central portion with an axial blind bore 43 opening onto the passage 5. The bore is provided, adjacent its closed end, with radial ports 44 which are able to communicate with the passage 42. A flexible sleeve 45 is formed integrally with the trap valve member 36, and is arranged to co-operate with the ports 44 to act as a one-way valve allowing flow in the direction from control chamber 15 into passage 42.

The modified construction of FIG. 3 will act with similar effect to that of FIG. 2. When the braking pressure is released and the inertia-controlled valve opens again, as before, the reverse pressure differential will close the trap valve, and cause the flexible sleeve 45 to deflect, thus allowing fluid recuperation via the ports 44.

Figure 4:
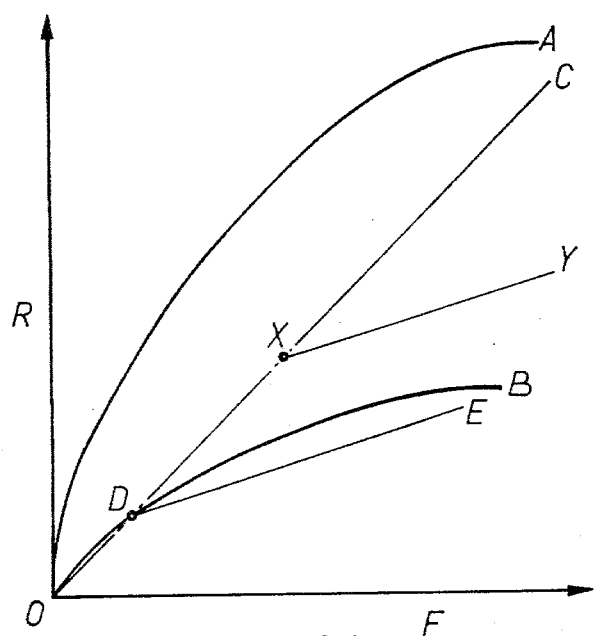
FIG. 4 is a graph showing the ratio of rear wheel brake pressure to front wheel brake pressure for the brake control unit of FIG. 1.
Figure 5:
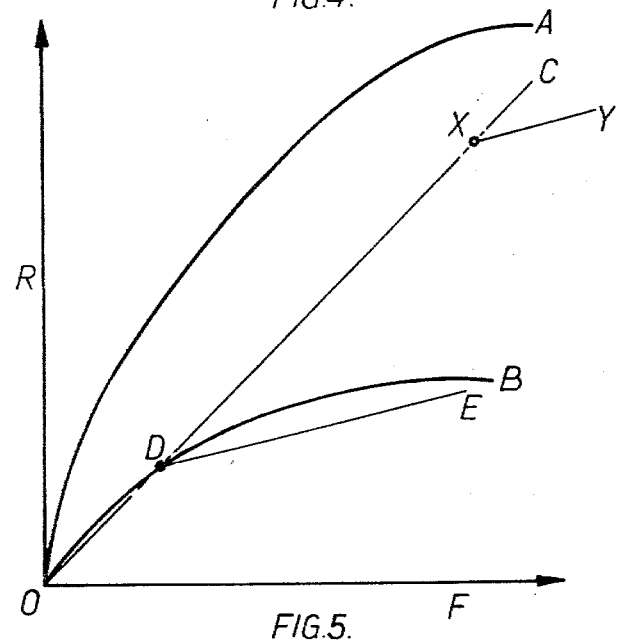
FIG. 5 is a graph similar to FIG. 4 but for the brake control unit of FIG. 2.

The operation of the brake control unit upon failure of the supply fluid to the front wheel brakes will be similar to that described with reference to FIG. 1. FIGS. 4 and 5 show the ratio of rear wheel brake pressure "R" to front wheel brake pressure "F" for FIGS. 1 and 2 respectively.

In each graph the line OA shows the ideal braking pressures for a laden vehicle, and the line OB shows those for an unladen vehicle. The line OC shows the normal ratio for the vehicle, without the provision of a brake control unit.

The lines ODE and OXY show the ratio of braking pressures for the unladen and laden conditions respectively when a brake control unit is installed. The points D and X show the pressure at which the metering valve 20 first closes, and the lines DE and XY the ratio thereafter.

For each brake control unit a ratio of cut-off pressure: deceleration pressure is set. In FIG. 4 this ratio is set, so that the line ODE approximates to OB, but the point X is too low on the line OC, so OXY does not approximate closely enough to OA.

In FIG. 5, the cut-off pressure: deceleration pressure ratio is set higher, so that OXY approximates to OA, and the provision of the trap line valve 35 effectively lowers the ratio for the lower braking pressures, which means that ODE still approximates to OB. Thus the pressures in FIG. 5 approximate more closely to the ideal pressures.

I claim:
1. A brake control unit for a vehicle hydraulic braking system, said braking system including a master cylinder for applying pressure to front and rear wheel brakes, said brake control unit being adapted for incorporation between said master cylinder and at least one hydraulic actuator for said rear wheel brakes, said front wheel brakes being adapted to be applied directly by pressure from said master cylinder, said control unit incorporating an inertia-controlled valve, adapted to close when the deceleration of said vehicle exceeds a predetermined value, and an outlet port for connection to said hydraulic actuator, closure of said inertia-controlled valve being operative to ensure that any subsequent increase in pressure applied to said outlet port occurs at a lesser rate than that at which the pressure of said master cylinder increases, said control unit also incorporating pressure-responsive override means responsive to the pressure applied to said front wheel brakes, said override means being operative, after closure of said inertia-controlled valve and following reduction in pressure applied to said front wheel brakes, to override the effect of said inertia-controlled valve in reducing the rate of pressure increase applied to said rear wheel brakes.

2. A brake control unit as claimed in claim 1, wherein said pressure-responsive override means are arranged to be operative when the pressure applied to said front wheel brakes drops to a predetermined value, so that thereafter full master cylinder pressure can be applied to said rear wheel brakes.

3. A brake control unit as claimed in claim 1, wherein said control unit comprises a housing, said housing being provided with a bore, and a control chamber in which a control pressure is generated, said control pressure corresponding to the pressure applied to said rear wheel brakes before said inertia-controlled valve closes, said override means comprising a piston working in said bore and having first and second ends, said first end of said piston being subjected to the pressure applied to said front wheel brakes, and said second end of said piston being subjected to said control pressure, said housing also being provided with a passage by-passing said inertia-controlled valve, and a metering valve, a bias force biassing said metering valve open, pressure being applied to said outlet port through said passage and said metering valve, said metering valve being responsive to movement of said piston, and being adapted to close following closure of said inertia-controlled valve and in response to movement of said piston when the pressure applied to said front wheel brakes attains a predetermined value sufficient to overcome said bias force.

4. A brake control unit as claimed in claim 3, wherein said piston and said bias force are arranged to provide a delay before said metering valve can close following closure of said inertia-controlled valve and thereby determine a "cut-off" point at which the pressure supplied to the rear brakes is cut-off, and thereafter metered to provide a reduced rate of pressure increase.

5. A brake control unit as claimed in claim 3, wherein said piston is of differential outline.

6. A brake control unit as claimed in claim 5, wherein said first end of said piston is of smaller area and said second end of of greater area and acts on said metering valve through a thrust member.

7. A brake control unit as claimed in claim 3, wherein a trap line valve is incorporated in a line between said inertia-controlled valve and said control chamber.

8. A brake control unit as claimed in claim 7, wherein said trap line valve is biassed to closure, and opens only when said inertia-controlled valve is open and the pressure differential across said trap line valve is sufficient to overcome said bias force.

9. A brake control unit as claimed in claim 8, wherein said trap line valve incorporates a recuperation valve to allow fluid recuperation from said control chamber after release of said brakes.

10. A brake control unit as claimed in claim 9, wherein said recuperation valve passes through an opening in said trap line valve, said recuperation valve comprising a frusto-conical poppet biassed into engagement with a portion surrounding said opening.

11. A brake control unit as claimed in claim 9, wherein said recuperation valve comprises an axial blind bore in said trap line valve, said blind bore opening onto the line to said control chamber, said blind bore being provided, adjacent its closed end, with radial ports, said ports communicating with the line to said inertia-controlled valve, and a flexible sleeve arranged to co-operate with said ports to act as a one-way valve allowing flow in a direction from said control chamber to said inertia-controlled valve.

12. A vehicle hydraulic braking system comprising front and rear wheel brakes, at least one hydraulic actuator for said rear wheel brakes, a master cylinder having a first pressure space connected directly to said front wheel brakes, and a second pressure space for applying pressure to said rear wheel brakes, and a brake control unit incorporated between said second pressure space and said hydraulic actuator for said rear brakes, said control unit incorporating an inertia-controlled valve, adapted to close when the deceleration of said vehicle exceeds a predetermined value, and an outlet port connected to said hydraulic actuator, closure of said inertia-controlled valve being operative to ensure that any subsequent increase in pressure applied to said outlet port occurs at a lesser rate than that at which the pressure of said master cylinder increases, said control unit also incorporating pressure-responsive override means responsive to the pressure applied to said front wheel brakes, said override means being operative, after closure of said inertia-controlled valve and following reduction in pressure applied to said front wheel brakes, to override the effect of said inertia-controlled valve in reducing the rate of pressure increase applied to said rear wheel brakes.

* * * * *